Oct. 6, 1925.

B. W. KING

EYE TESTING

Filed May 7, 1923

INVENTOR
B. W. KING
BY
Harry H. Styll
ATTORNEY

Patented Oct. 6, 1925.

1,556,525

UNITED STATES PATENT OFFICE.

BURNHAM W. KING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE TESTING.

Application filed May 7, 1923. Serial No. 637,089.

*To all whom it may concern:*

Be it known that I, BURNHAM W. KING, a citizen of the United States, residing at Southbridge, in the county of Worcester and State of Massachusetts, have invented certain new and useful Improvements in Eye Testing, of which the following is a specification.

This invention relates to a novel and improved method or process of testing eyes, and to improved means for use in performing the tests.

I have discovered that the method commonly used at the present time for testing eyes, and especially as used in testing for astigmatism, is not as sensitive as might be, or of maximum efficiency in determination of the visual defects of the eye. This present method includes the employment of a testing device in the form of a chart or the like, having a light background bearing test letters, objects or dials ordinarily black or dark in tint. The idea underlying this has been that on account of the pronounced contrast between the white and black the eye could readily distinguish the test objects within its focal range and determine the relative visibility of the radiating lines or spokes of the astigmatic dial.

Unfortunately, however, the eye is not achromatic and has color errors of definition as well as focal errors, but hitherto the former have not been taken into consideration during the attempted measurement of the latter.

Objects of the present invention therefore include the provision of a new method of testing which shall take into account the color sensitivity of the eye, which shall accentuate the visibility of properly focused objects or conversely the hazy appearance of objects not in focus, and which shall particularly employ for the testing a limited band only of the visible spectrum.

Further objects include the provision of novel forms of test objects or charts for use in carrying out the method of testing and of novel structural means for emphasizing the distinction in appearance between properly and improperly focused portions of the test objects.

In its broadest aspect the invention contemplates the testing of the eye through the use of charts or test objects having a suitable background distinguishing from the objects, and in so modifying the ordinary white appearance of the background that either all or a limited portion thereof immediately adjacent the test objects will be changed from a tint comprising many colors to one substantially monochromatic. That is to say, in place of the objects being pronouncedly bordered by or reaching the eye as standing out against a white background, white light containing all visible radiations, the images as they reach the eye will be against a colored or sensitive tint background. Broadly speaking, this may be accomplished either through the use of a colored background, through the coloring of portions only of the background, or through the use of an ordinary chart with a suitable light absorbing glass or lens before the eye, modifying the rays just before they enter the eye in place of at the source. Also a similar effect may be produced by proper modification of the illumination for the test object.

In a more specific aspect, the invention comprises a chart having a white background and black or dark test objects on the chart, said objects having borders in the form of bands or contours of proper color surrounding the sides of the objects and preferably slightly spaced therefrom so that when in correct focus a slight portion of the background will appear between the object and the color band enhancing the contrast while the color band relieves the eye of strain or color errors as respects the general area surrounding the test object.

The drawings are semi-diagrammatic in character to bring out certain specific embodiments only of the principles of the invention.

The numeral 1 designates the body portion or background of a chart having in this instance a white surface on which is printed the test objects or lines 2, as in black, and having on each side of the lines 2 the bands 3, preferably of a pink, amethyst, magenta, or so called sensitive tint. A particularly desirable shade is magenta, this color bordering on the indefinite or variable under different lighting effects and being what is termed unstable optically so that while clearly affecting the eye and accentuating the appearance of the object against the background when the object is in focus, when out of focus it will have a shifting or haze effect accentuating the visual error and thus aiding in distinguishing between the various lines or spokes of an astigmatic dial such as has been chosen for purposes of illustration. These bands are spaced from the sides of the test objects as by the narrow white strips 4.

Figure 1:
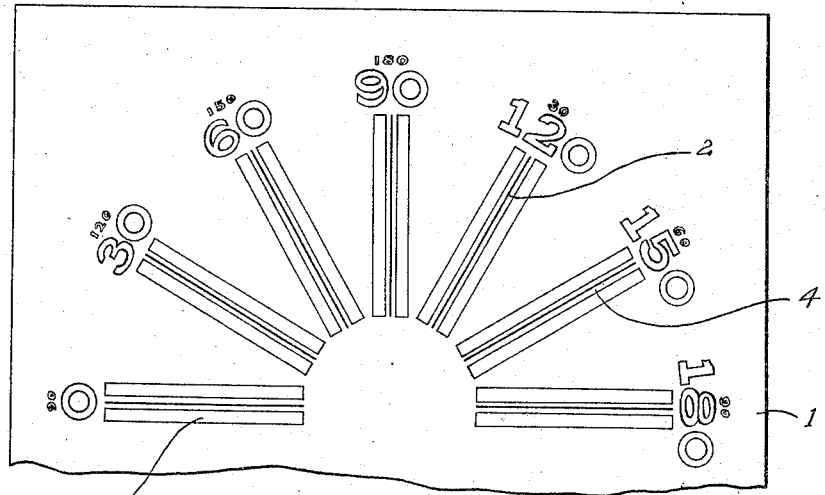
Figure 1 is a view of a portion of a chart.
Figure 2:
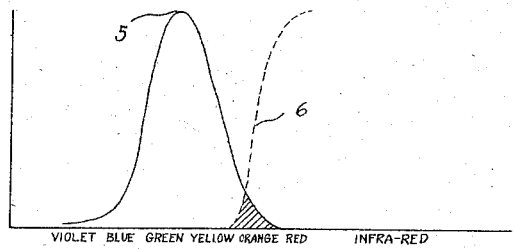
Figure 2 is a diagram of the light sensitivity curve of the eye, indicating a preferred spectral band to be employed in the testing, and Figure 3 diagrammatically illustrates one method of performing the test.

In Figure 2 is shown the normal light sensitivity curve of the eye having its peak 5 in the green portion of the spectrum and dropping rather sharply toward the red and blue wave lengths. A selected band has been indicated at 6 as the preferred portion of the spectrum to employ in monochromatic testing, which is obtained by the use of a deep orange colored lens 7, this band being taken from the red end of the spectrum as more desirable optically than the blue and as eliminating substantially all other color effects when combined with the normal eye sensitivity curve 5 of the eye, and being, therefore, visually monochromatic.

Figure 3:
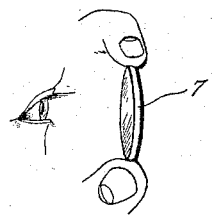
Figure 3:
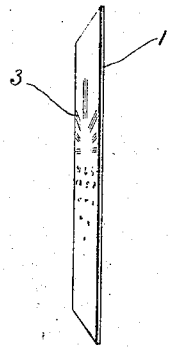

As an alternative method of performing the test either an ordinary chart may be used or preferably the improved chart herein described, in connection with which a glass filter 7 of colored material is placed before the eye to render all entering light waves visually monochromatic. This is illustrated in Figure 3, and its effect is to eliminate the color errors of the eye, leaving only the focus errors which are under test. Other colors may be used, such as a deep blue, the requirements being that the transmission curve of the filter meets the visual sensitivity curve of the eye in such a way that the resultant color transmitted is nearly visually monochromatic, as illustrated by the shaded portion of Figure 2.

In operation it will be understood that test can be made either with or without the color filter, but the combination is more satisfactory.

Referring to the chart, the black line 2 is the part which is in the color field, preferably the magenta field. This color has an absorbing band in green, which is near the point of maximum visual sensitivity of the eye, or at approximately 0.55 microns. A color having an absorbing band at this point is often spoken of as a sensitive tint because a slight variation one way or the other makes a great difference in the color, provided the color being viewed is nearly neutral. The colored glass or filter is a very deep orange, which cuts out all of the green, blue green, and some of the yellow. When this is combined with the visual sensitivity curve of the eye we have the equivalent of a nearly monochromatic line test of the eye. This eliminates nearly all of the chromatic errors of the eye and leaves only the focal errors of the eye to be contended with, while all systems of testing eyes that have hitherto been used attempt to test for the focal errors of the eye in the presence of all the color errors.

From the foregoing it will be seen that I have originated a new method of testing the eye, which consists in eliminating the color errors, and in addition thereto have provided a chart wherein the sensitivity of the testing device is intensified, and also have provided a filter screen which still further intensifies the contrast.

I claim:

1. An eye testing chart having an astigmatic dial, and colored bands bordering the several spokes of the dial.

2. An eye testing chart including a plurality of radiating dark spokes, and tinted bands bordering the spokes.

3. In an eye testing chart, a test character, and spaced colored contours enclosing the sides thereof.

4. In eye testing, the combination with a dark test object, of light background therefor, and tinted bands interrupting the continuity of the background adjacent the test object.

5. In eye testing, the combination with a dark test object, of a light background therefor, and tinted bands interrupting the continuity of the background adjacent the object, said bands being laterally spaced from the object.

6. An astigmatic chart having radiating narrow test lines, and having wide border markings for the test lines, said border markings being spaced laterally from the test lines, and being substantially coextensive therewith.

7. A chart for eye testing purposes, comprising a background, test objects distinctively displayed on the background, and colored borders on the background for the test objects, the color of the borders being of a sensitive tint.

8. A chart for eye testing purposes, comprising a background member having markings on its face forming test objects pronouncedly contrasting with the background, and borders for the test objects, said borders being of a pinkish color.

9. A chart for eye testing purposes, comprising a background member having a light surface, darker markings on said surface forming test objects, and border members for the test objects on the background spaced from the objects, the light surface of the background appearing intermediate the objects and border members, and the latter being less visible than the markings forming the test objects.

10. In an eye testing chart, a test character and a colored part bordering the test character.

11. In an eye testing chart, a test character and a colored part bordering the test character and slightly spaced therefrom.

12. In an eye testing chart, a test character and a pink colored part bordering the test character.

13. In an eye testing chart, a test character and a pink colored part bordering the test character but slightly spaced therefrom.

BURNHAM W. KING.